UNITED STATES PATENT OFFICE.

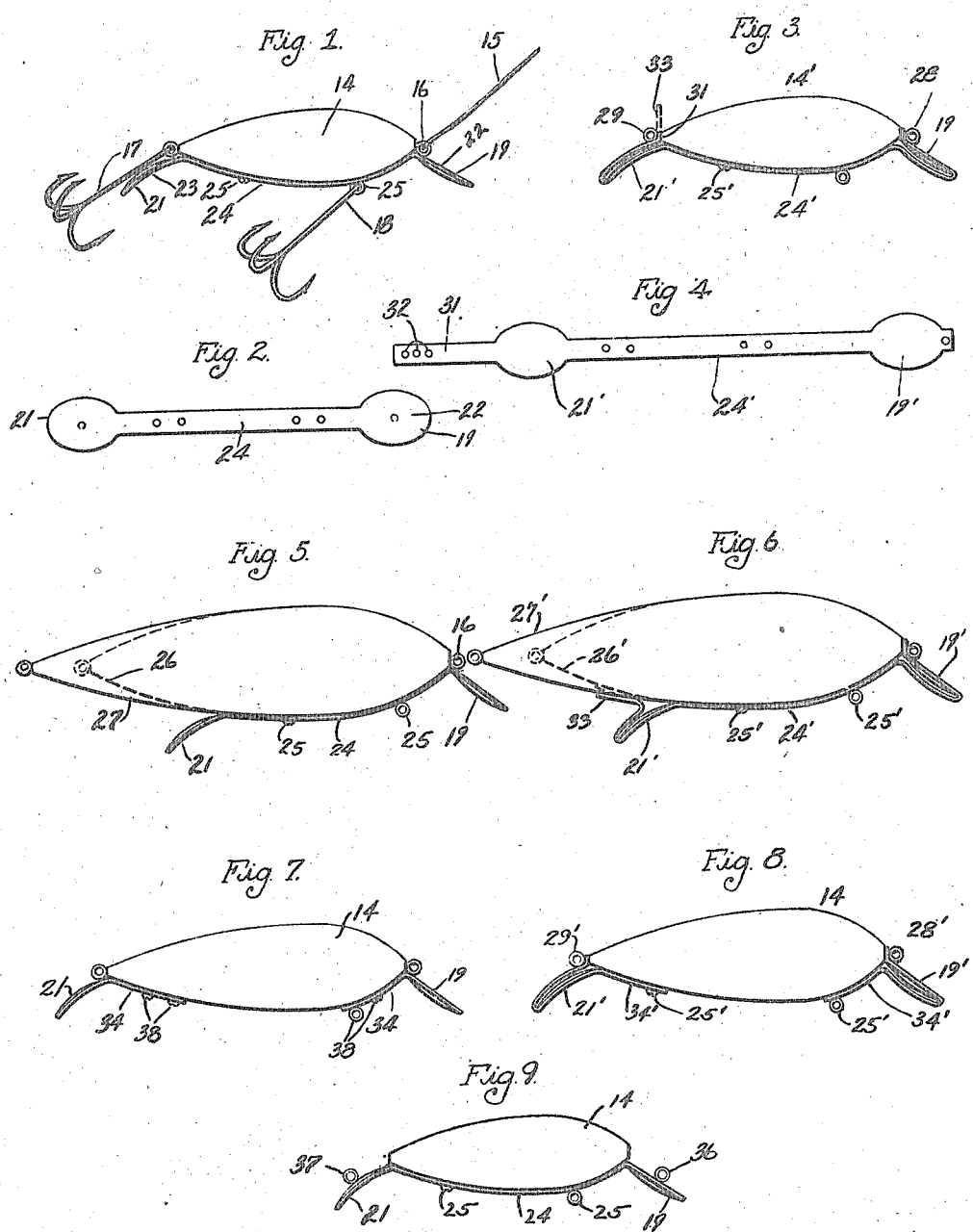

FRED C. KEELING, OF ROCKFORD, ILLINOIS.

ARTIFICIAL BAIT.

1,345,600.

Specification of Letters Patent.  Patented July 6, 1920.

Application filed October 15, 1919. Serial No. 330,686.

*To all whom it may concern:*

Be it known that I, FRED C. KEELING, a citizen of the United States, residing at Rockford, in the county of Winnebago and State of Illinois, have invented certain new and useful Improvements in Artificial Bait, of which the following is a specification.

This invention pertains in general to fishing, and has more particular reference to artificial bait, such as is used when casting with a rod and line. It is well recognized in the art of casting that the best results are obtained by the use of bait which may, by the skill of the fisherman, be caused or played to simulate the actions and motions of live bait, such as minnows. To this end, it is common practice to use artificial minnows equipped with gang hooks, which when drawn through the water, will wiggle, and in other cases have spinners which attract the fish. Artificial baits of this character heretofore provided, have not, however, been controllable by the fisherman while casting to simulate to a high degree of perfection the action of a live minnow, and thus they fall short of being an effectual lure for game fish.

The present invention has reference to what is known as a wiggle minnow having an artificial body preferably resembling a minnow and equipped with one or more gangs of hooks. Most wiggle minnows float, and when reeled, they dive, catching in weeds, grass, stumps, etc., in shallow water. It is impossible to reel them fast enough to go down into the holes where the fish are in the heat of the day. In other words, the ordinary wiggle minnow so far as I am aware, can not be manipulated by the reel to sink and rise while wiggling through the water, to dive into the holes, or to rise over logs or obstructions in the water. It is with these conditions in mind that I have devised, and the present invention contemplates as a primary object, a wiggle minnow of such novel construction that it is adapted by reeling to very accurately simulate the movements of a live minnow, and is further adapted to be positively controlled to the end that it furnishes a lure for game fish even more effective than live bait.

To this end, my invention contemplates, generally stated, the provision of an artificial minnow body equipped at its forward end with a forwardly and downwardly inclined wing or fin presenting a forward surface, which taken alone would have a tendency to cause the minnow to dive, and a second wing or fin located near the rear of the minnow body and extending rearwardly and downwardly presenting a forward surface, which taken with the forward wing, has the effect of normally keeping the minnow on an even keel. The minnow is preferably equipped with a tail gang and a belly gang of hooks, and by reason of the novel arrangement of wings, a peculiar wiggle effect is produced when the minnow is drawn through the water, the front and rear ends of the body rotating laterally. This wiggler sinks rather than floats when dropped into the water, and by proper manipulation of the pole and reel, it may be caused to maneuver in a most life-like manner, into holes, over logs, obstructions, etc., enabling the fisherman to make more catches than is possible with any other kind of bait.

Another object of my invention is to provide as an article of manufacture, a wiggler attachment of the character described, so constructed that it may be produced economically and attached to minnow bodies of various sizes.

I have further aimed to provide a wiggler attachment, which when properly applied to a minnow body, or the like, will be permanently held in the desired position and will not be subject to accidental displacement through ordinary usage. The reason for this is that it is frequently found that wings which are relatively movable and adjustable get out of proper adjustment and produce either no effect whatsoever or cause the minnows to maneuver in a manner harmful to the objects in mind. With the use of my improvements the wings are permanently secured in the novel arrangement mentioned above, thus insuring the desired wiggling action and maneuvering qualities at all times.

Other objects and attendant advantages will be appreciated as the invention becomes better understood by reference to the following description when considered in connection with the accompanying drawings, in which—

Figure 1 is a side view of the preferred form of an artificial wiggle minnow embodying my improvements;

Fig. 2, a development of the wiggler attachment applied to the minnow body shown in Fig. 1;

Fig. 3, a side view of a modified form of my improvements;

Fig. 4, a development of the wiggler attachment shown in Fig. 3;

Figs. 5 and 6, side views of the wiggler attachment shown in Figs. 1 and 3 respectively, as applied to larger minnow bodies; and Figs. 7, 8 and 9, modified forms of my improvements.

The artificial minnow bodies with which my improved wiggler attachments are used, might be of any suitable or preferred size and shape and might be constructed of wood, metal or any suitable material. In the present instance, the wiggler bodies shown are of conventional shape and size, the body 14 illustrated in Fig. 1 being considered a small size. In this case, the line 15 is attached to the body by means of a screw eye 16 at the nose of said body and below the major axis thereof, although the eye 16 might be attached to the front wing, as will be described hereinafter. A tail gang of hooks 17 and a belly gang 18 are attached to the minnow body in the relation signified. My invention contemplates the provision of a wiggler attachment which will not only impart the desired lateral wiggling movement, but will also maintain the minnow body on an even keel, or will permit the body to rise or sink according to the speed of reeling. These functions are obtained by the provision of front and rear wings 19 and 21 respectively disposed beneath the longitudinal medial line of the minnow body, the front wing extending forwardly and downwardly from said body and the rear wing extending rearwardly and downwardly. The front wing presents a forward surface 22 to the water when the minnow body is drawn forward and the rear wing presents a forward surface 23. These surfaces might be either flat or concave to function satisfactorily. In the preferred form, the forward and rear wings are formed integral with a connector 24. In other words, the wiggler attachment as shown in Fig. 2 consisting of a front and rear wing joined by a connecting part is punched from a single piece of sheet material. With a construction of this kind, the part 24 which is shown, fits flat against the underside of the minnow body and is rigidly secured thereto by means of suitable fastening screws 25. By reason of the foregoing construction the front and rear wings are rigidly secured to the minnow body in fixed relative relation so as to insure against accidental displacement of the wings and prevent tampering and resetting them in positions which will not produce the most effective and desired action. The action in the water is a vibratory movement substantially in a horizontal plane, in which the ends of the body oscillate back and forth laterally in a quick movement so that the effect when the body is drawn through the water very closely simulates the movements of a live minnow. My improved wiggler is adapted for use in both deep and shallow water and can be made to maneuver by proper reeling to suit practically any condition.

In Fig. 5, I have shown the wiggler attachment just described as applied to artificial minnow bodies 26 and 27 of larger size than the body 14. In the case of the larger bodies, the attachment is applied with the front wing 19 in practically the same relation to the nose of the body as in the case of the small body. This arrangement, however, does not affect the action desired as the wiggler attachment works equally well on any of the standard sizes of minnow bodies. It will be manifest also that a saving in the cost of manufacture is effected, since the attachment in one size is adapted for any of a plurality of sizes of minnow bodies.

In Figs. 3 and 4, I have illustrated a somewhat modified form of the invention, the modification pertaining to the method of securing the wiggler attachment to the main body. In this instance, the front and rear wings 19' and 21' formed integral with a connecting part 24' as in the former case, are secured to the minnow body primarily by means of screws 25' and the nose and tail eyes 28 and 29 respectively. To accomplish this the connector part 24' is made somewhat longer than the part 24 so as to allow the wing 19' to be bent back upon itself as clearly shown in Fig. 3, thus presenting an unobstructed front face. The rear wing 21' is formed with a tab 31 having a plurality of holes 32 therethrough for the reception of fastening means. In the case of the smallest minnow body, the screw eye 29 would be passed through the innermost hole 32 and the projecting end 33 indicated in dotted lines in Fig. 3, will be cut off or bent forwardly, if desired. This form of wiggler attachment may be equally well applied to larger sizes of minnow bodies 26' or 27' as illustrated plainly in Fig. 6.

My invention contemplates also the attachment of front and rear wings as independent parts to the front and rear portions of a minnow body in the same relative relation as described above with reference to the preferred embodiment. These wings 19 and 21 might be attached directly to a body 14 either by means of screws 38 or they might be formed with tabs 34 in turn secured by means of screws to the underside of the inner body, as shown in Fig. 7. In like manner, the wings of the form illustrated in Fig. 3, might be separated and provided with tabs 34' and attached by means of screws 25', 28' and 29' to the body, as shown in Fig. 8. In the latter instances, it will be manifest that the rear wings might be attached close to the tail of each minnow body irrespective of its length.

Fig. 9 shows a one-piece form of wiggler attachment of the type described with reference to Fig. 1, in which the casting line eye 36 is attached to the front wing 19 and the tail gang eye 37 attached to the rear wing 21.

It is believed that the foregoing conveys a clear understanding of the principles of my invention and the objects prefaced above, and while I have shown several modifications, it should be understood that these are simply for purpose of illustration and that various changes might be made in the construction and arrangement without departing from the spirit and scope of the invention as expressed in the appended claims, in which—

1. An artificial bait comprising an elongated body, a forwardly and downwardly inclined wing at the front of said body, a rearwardly and downwardly inclined wing at the rear portion of the body, and a part joining and holding said wings in fixed relative relation.

2. A wiggler minnow comprising an artificial body adapted to be drawn by a line connected to the front end thereof, a front wing on said body adjacent to the nose thereof extending forwardly and downwardly therefrom, and a rear wing on said body extending rearwardly and downwardly therefrom.

3. A wiggler minnow comprising an artificial body, a front wing inclined forwardly and downwardly and having a rearwardly extending shank fitting flat against said body and rigidly secured thereto, a rear wing inclined rearwardly and downwardly and also having a shank fitting flat against said body and rigidly secured thereto, whereby said wings are held in fixed relative relation.

4. A wiggler attachment for artificial minnows or the like comprising an elongated shank having at each end portion a wing, said shank adapted for attachment to an artificial minnow body with one wing at the front inclined forwardly and downwardly and the other wing near the rear inclined rearwardly and downwardly.

5. A wiggler attachment of the character described comprising an elongated shank formed adjacent to each end with a wing, said shank adapted for attachment at one side to an artificial bait body, and said wings bent away from said attaching side and diverging therefrom.

6. The combination of an elongated artificial bait body, a wing extending downwardly and forwardly from the nose of said body, a wing extending downwardly and rearwardly from the tail of said body, and means for preventing displacement of said wings relatively to each other.

FRED C. KEELING.